US011892042B2

(12) United States Patent
An et al.

(10) Patent No.: US 11,892,042 B2
(45) Date of Patent: *Feb. 6, 2024

(54) BRAKE MECHANISM, JOINT ACTUATOR, AND ROBOT

(71) Applicants: SHANGHAI FLEXIV ROBOTICS TECHNOLOGY CO., LTD., Shanghai (CN); FLEXIV LTD.

(72) Inventors: Ran An, Santa Clara, CA (US); Juncai Peng, Shanghai (CN)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,464

(22) Filed: Apr. 27, 2022

(65) Prior Publication Data

US 2022/0252114 A1    Aug. 11, 2022

Related U.S. Application Data

(63) Continuation of application No. 16/661,178, filed on Oct. 23, 2019, now Pat. No. 11,346,410, which is a
(Continued)

(51) Int. Cl.
*F16D 55/02* (2006.01)
*F16D 67/06* (2006.01)
(Continued)

(52) U.S. Cl.
CPC .......... *F16D 55/025* (2013.01); *F16D 59/02* (2013.01); *F16D 67/06* (2013.01); *F16D 2055/0041* (2013.01)

(58) Field of Classification Search
CPC ........ F16D 55/025; F16D 59/02; F16D 67/06; F16D 2055/0041; B25J 19/0004; B25J 17/00; B25J 9/126
See application file for complete search history.

(56) References Cited

U.S. PATENT DOCUMENTS 4,078,637 A * 3/1978 Hanks ................... F16D 65/847
                                                        188/170
4,645,039 A   2/1987 Ewis et al.
(Continued)

FOREIGN PATENT DOCUMENTS

CN    207172121 U    4/2018
CN    108189078 A    6/2018
(Continued)

OTHER PUBLICATIONS

PCT Notification of Transmittal of the International Search Report and the Written Opinion of the International Searching Authority, or the Declaration, Form PCT/ISA/2020, dated Jun. 28, 2020, pp. 1-10, Beijing, China.
(Continued)

*Primary Examiner* — Xuan Lan Nguyen
(74) *Attorney, Agent, or Firm* — Dorsey & Whitney LLP

(57) ABSTRACT

The present disclosure relates to a brake mechanism, a joint actuator and a robot. The brake mechanism includes a friction member configured to be fixed to a rotor of the motor, a brake member abutting against one side of the friction member, a pushing member abutting against the other side of the friction member and configured to provide an adjustable pushing force to the brake member, a locking mechanism configured to prevent the brake member from rotating according to a brake command.

18 Claims, 8 Drawing Sheets

Related U.S. Application Data continuation-in-part of application No. PCT/CN2019/107470, filed on Sep. 24, 2019.

(51) Int. Cl.
*F16D 59/02* (2006.01)
*F16D 55/00* (2006.01)

(56) References Cited

U.S. PATENT DOCUMENTS

| | | |
|---|---|---|
| 5,057,728 A | 10/1991 | Dammeyer et al. |
| 9,976,615 B2 | 5/2018 | Patil et al. |
| 2015/0345571 A1 | 12/2015 | Yi et al. |
| 2016/0341267 A1 | 11/2016 | Takada |

FOREIGN PATENT DOCUMENTS

| | | |
|---|---|---|
| CN | 108603549 B | 9/2019 |
| JP | 6220650 B2 | 10/2017 |
| KR | 20190074701 A | 6/2019 |

OTHER PUBLICATIONS

U.S. Appl. No. 16/661,178, filed Oct. 23, 2019.

\* cited by examiner

BRAKE MECHANISM, JOINT ACTUATOR, AND ROBOT

CROSS-REFERENCE TO RELATED APPLICATIONS

This application is a continuation of U.S. application Ser. No. 16/661,178, filed Oct. 23, 2019, which is a continuation-in-part of PCT application No. PCT/CN2019/107470, filed Sep. 24, 2019. The disclosures of the above-identified applications are hereby incorporated herein in their entireties by reference.

TECHNICAL FIELD

The present disclosure relates to the field of brake technology, and in particular to a brake mechanism, a joint actuator, and a robot.

BACKGROUND

A robot is a machine device that can perform a certain action task automatically. An actuator in each joint of the robot can drive a robot arm connected thereto to move. The actuator is provided with a brake mechanism for stopping movement of the robot arm or maintaining a certain spatial posture of the robot arm. If friction force of the brake mechanism in the robot is too large, it may cause impact to the brake mechanism and other components in the joint actuator during the brake operation, and damage may be caused. If the friction force is too small, the brake distance will be increased, which affects safety of robot control.

SUMMARY

According to embodiments of the present disclosure, a brake mechanism, a joint actuator, and a robot are provided to solve the above technical problems in the prior art.

In a first aspect, embodiments of the present disclosure provide a brake mechanism for a motor including: a friction member configured to be fixed to a rotor of the motor; a brake member abutting against one side of the friction member; a pushing member abutting against the other side of the friction member and configured to provide an adjustable pushing force to the brake member; and a locking mechanism configured to prevent the brake member from rotating according to a brake command.

In a second aspect, the embodiments of the present disclosure provide a joint actuator including a motor and a brake mechanism described above, the friction member is fixedly connected to a rotor of the motor.

In a third aspect, embodiments of the present disclosure provide a robot including a joint actuator described above.

One or more embodiments are further described below with reference to the drawings and specific embodiments. Other features, objects and beneficial effects of the present disclosure will be apparent to those skilled in the art from the description of the specification, drawings and claims.

The additional details or examples used to describe the drawings are merely one embodiment and should not be construed as limiting the scope of any of the disclosed disclosure, the presently described embodiments, and the best mode of the disclosure as understood.

DESCRIPTION OF DRAWINGS REFERENCE 10, brake mechanism, 11, friction member, 111, groove, 12, brake member, 13, pushing member, 14, locking mechanism, 141, stopping needle, 142, driving member, 15, fixing member, 151, screw thread, 152, fixing plate, 1521, auxiliary groove, 153, limiting groove, 16, pushing nut, 17, washer, 171, limiting protrusion, 20, joint actuator, 21, motor cover, 211, through hole, 22, motor, 221, rotor, 222, stator, 223, output end, 30, robot, 31, robot arm, 32, joint.

DETAILED DESCRIPTION OF THE EMBODIMENTS

To enable the above objects, features and advantages of the present disclosure to be more clearly understood, specific embodiments of the present disclosure will be described in detail below with reference to the accompanying drawings. Numerous specific details are set forth in the following description in order to facilitate a thorough understanding of the present disclosure. However, the present disclosure can be practiced in many other ways different from those described herein, and similar modifications can be made by those skilled in the art without departing from the meaning of the present disclosure, such that the present disclosure is not limited by the specific embodiments disclosed below.

It should be noted that when an element is referred to as being "fixed" to another element, it can be directly on the other element or it can also be presence of a central element. When an element is considered to be "connected" to another element, the element can be directly connected to the other element or it can be simultaneous presence of the central element. The terms "vertical", "horizontal", "left", "right" and the like used herein are for illustrative purposes only and are not meant to be the only embodiment.

Unless otherwise defined, all technical and scientific terms used herein have the same meaning as generally understood by those skilled in the art of the present disclosure. The terms used herein in the specification of the disclosure are for the purpose of describing specific embodiments only and are not intended to limit the disclosure. The various technical features of the above-described embodiments can be arbitrarily combined, and for the sake of brevity, all possible combinations of the various technical features in the above-described embodiments are not described. However, as long as there is no contradiction in the combination of these technical features, it should be deemed to be within the scope of this specification.

Figure 1:
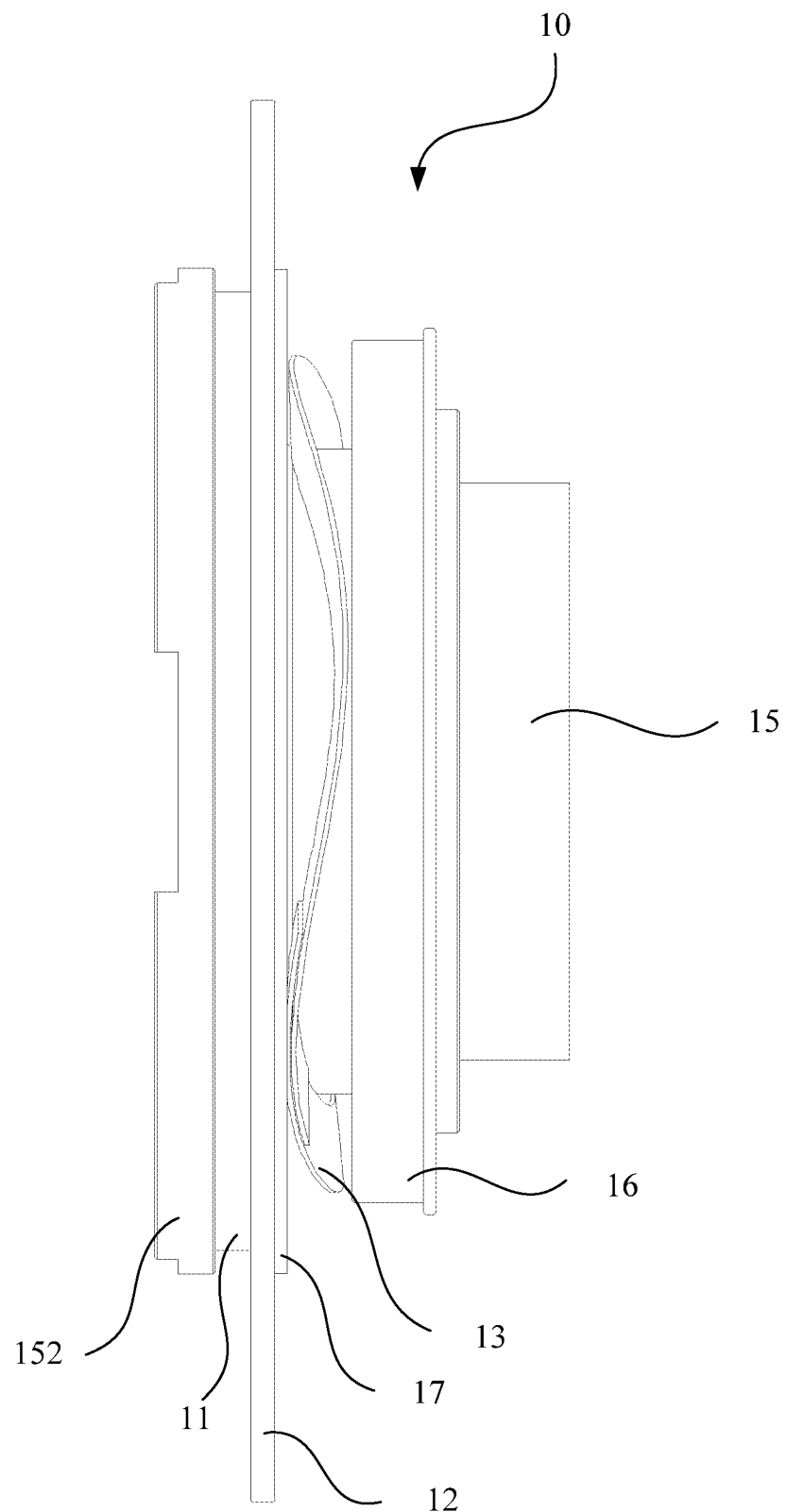
FIG. 1 is a front view of a brake mechanism in accordance with an embodiment of the present disclosure.
Figure 2:
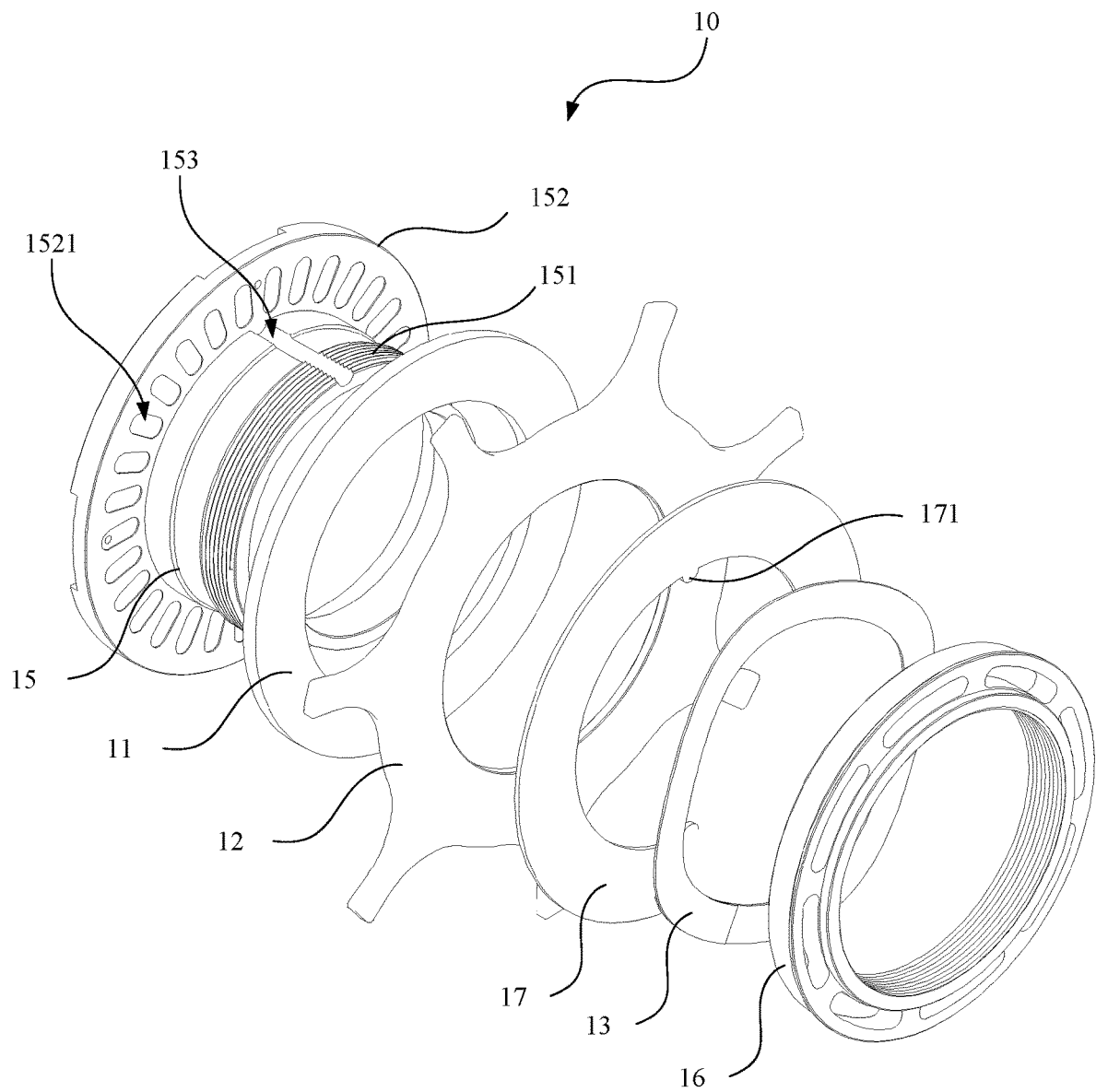
FIG. 2 is an exploded view of the brake mechanism of FIG. 1.

As shown in FIGS. 1 and 2, a brake mechanism 10 for a motor is provided in one embodiment. The brake mechanism 10 may include a friction member 11, a brake member 12, a pushing member 13, and a locking mechanism 14. The friction member 11 is configured to be fixed to a rotor 221 of a motor 22. The friction member 11 abuts against one side of the brake member 12. The pushing member 13 abuts against the other side of the brake member 12 to provide an adjustable pushing force to the brake member 12. The locking mechanism 14 is used to prevent the brake member 12 from rotating according to a brake command.

By adjusting the pushing force of the pushing member 13 to the brake member 12, friction force between the friction member 11 and the brake member 12 can be adjusted, such that the friction force between the friction member 11 and the brake member 12 can be maintained within an appropriate range. Specifically, the rotor 221 of the motor 22 drives the friction member 11 fixed to the rotor 221 to rotate during its rotation, and the brake member 12 rotates simultaneously under the friction force. When the rotor 221 of the motor 22 stops rotating and requires to be held in a specific position, the locking mechanism 14 cooperates with the brake member 12 to prevent the brake member 12 from rotating. The friction member 11 and the rotor 221 of the motor 22 also gradually stop under the friction force. After a period of usage, the friction member 11 and/or the brake member 12 will be worn, resulting in a change of the friction force between the friction member 11 and the brake member 12. In this situation, the friction force between the friction member 11 and the brake member 12 can be restored to an appropriate range by adjusting the pushing force of the pushing member 13 against the brake member 12.

Specifically, when the pushing member 13 is an elastic member, the pushing force of the pushing member 13 to the brake member 12 can be adjusted by changing compression amount of the pushing member 13. Regarding the compression amount of the pushing member 13, a limiting member can be provided on a side of the pushing member 13 away from the brake member 12, and the distance between a limiting member and the brake member 12 can be adjusted, such that the compression amount of the pushing member 13 abutted between the brake member 12 and the limiting member can be changed.

Specifically, the pushing member 13 can be an annular pushing spring, a columnar compression spring, a set of electromagnets that can generate mutually exclusive force, or other devices that can generate the pushing force, which are not specifically limited hereto.

Further, when the pushing member 13 is the elastic member, the pushing member 13 is in a compression state in operation. Thus, even if the friction member 11 and the brake member 12 are somehow worn during use, the deformation of the pushing member 13 can enable the friction member 11 and the brake member 12 to be in an abutting state constantly, which may make sure that the friction force between the brake member 12 and the friction member 11 can be maintained within the appropriate range. In addition, it is not necessary to pre-tighten an excessive force between the brake member 12 and the friction member 11 at an initial stage of assembling for a certain friction force between the friction member 11 and the brake member 12 during installation and commissioning. It is only necessary to compress the pushing member 13 to a certain amount during assembling, such that the friction force between the brake member 12 and the friction member 11 can be maintained within the appropriate range, and the wear of the friction member 11 and the brake member 12 may be reduced. During use, although the pushing member 13 is elongated as the brake member 12 and the friction member 11 are worn, the friction force between the brake member 12 and the friction member 11 can be still maintained within the appropriate range.

Apparently, if the pushing member 13 is a set of electromagnets, they can act the same as the elastic member. Even if there is the wear between the friction member 11 and the brake member 12, the brake member 12 and the friction member 11 can always be abutted due to the exclusive force between the electromagnets, such that the friction force can be maintained within the appropriate range. In other words, the friction force between the brake member 12 and the friction member 11 can be dynamically adjusted through the pushing member 13.

Specifically, in one embodiment, as shown in FIGS. 1, 2, 5, and 6, when the pushing member 13 is the elastic member, it can be an annular pushing spring. One side of the pushing spring abuts against the brake member 12 to provide the pushing force to the brake member 12.

As shown in FIGS. 1, 2, 5, and 6, upper and lower surfaces of the annular pushing spring axially undulate to form a wave-shaped annular structure so as to abut against the brake member 12. Each contact point of the pushing spring protruding with respect to the brake member 12 provides the pushing force to the brake member 12.

The contact points are uniformly distributed on the pushing spring in a circumferential direction, such that the brake member 12 is more uniformly stressed.

Alternatively, in one embodiment, the pushing member 13 may include a number of columnar compression springs spaced apart in the circumferential direction of the brake member 12. One end of the compression spring abuts against the brake member 12 to provide the pushing force to the brake member 12.

In other words, by circumferentially distributing the compression springs to provide the pushing force to the brake member 12, the brake member 12 is tightly pressed on the friction member 11 to secure the friction force between the brake member 12 and the friction member 11.

Further in one embodiment, when the pushing member 13 is a set of electromagnets, the pushing member 13 can include a first electromagnet and a second electromagnet. The first electromagnet abuts against the brake member 12, and the second electromagnet is arranged corresponding to the first electromagnet. When both of the first electromagnet and the second electromagnet are energized, the mutually exclusive force is generated between the first electromagnet and the second electromagnet. The magnetic force of the first electromagnet and/or the second electromagnet is adjustable.

During use, the pushing force of the pushing member 13 to the brake member 12 can be adjusted by adjusting the magnetic force of the first electromagnet and/or the second electromagnet, such that the friction force between the brake member 12 and the friction member 11 can be adjusted. Furthermore, by using the first electromagnet and the second electromagnet, the process of adjusting the pushing force can be automatically controlled.

Further, in one embodiment, as shown in FIGS. 1, 2, 5, and 6, in order to improve the uniformity of the force applied by the pushing member 13 to the brake member 12, a washer 17 can be further provided between the pushing member 13 and the brake member 12. The washer 17 is clamped between the brake member 12 and the pushing member 13. Moreover, the washer 17 is configured to avoid direct contact between the pushing member 13 and the brake member 12, thus avoiding the occurrence of friction between the pushing member 13 and the brake member 12 when the brake member 12 rotates.

Further, in one embodiment, as shown in FIGS. 1, 2, 5, and 6, the brake mechanism 10 may further include a fixing member 15. Both of the friction member 11 and the brake member 12 are sleeved on the fixing member 15. The friction member 11 is circumferentially fixed with respect to the fixing member 15, and the brake member 12 is circumferentially slidable with respect to the fixing member 15.

During general use, the fixing member 15 is connected to the rotor 221 of the motor 22 or the like. During normal operation, the rotor 221 of the motor 22 drives the fixing member 15 together with the friction member 11 and the brake member 12 to rotate.

During braking, the locking mechanism 14 prevents the brake member 12 from rotating, and the brake member 12 prevents the friction member 11 from rotating under the friction force between the brake member 12 and the friction member 11, thereby preventing the rotor 221 of the motor 22 from rotating.

When the rotation speed of the rotor 221 of the motor 22 is relatively low, static friction force between the brake member 12 and the friction member 11 is large enough to prevent the friction member 11 from rotating with respect to the brake member 12. The friction member 11 is circumferentially fixed to the fixing member 15, thereby achieving braking. When the rotation speed of the rotor 221 of the motor 22 is relatively high, although the brake member 12 is prevented from rotating, the friction member 11 and the fixing member 15 continue to rotate due to large kinetic energy of the rotor 221 of the motor 22. A relative rotation occurs between the friction member 11 and the brake member 12. The friction member 11, the fixing member 15, and the rotor 221 of the motor are gradually stopped under a dynamic friction force between the friction member 11 and the brake member 12.

Specifically, as shown in FIG. 2, the fixing member 15 can be of a cylinder shape, for example, a fixing cylinder. Alternatively, the fixing member 15 can be columnar in shape, such as a cylindrical fixing member, a prismatic fixing member, or the like.

Further, as shown in FIG. 2, in one embodiment, both of the friction member 11 and the brake member 12 are annular in shape, and both of the friction member 11 and the brake member 12 are sleeved on the fixing member 15.

Further, as shown in FIGS. 1, 2, 5, and 6, when the washer 17 is provided between the brake member 12 and the pushing member 13, the washer 17 can also be sleeved on the fixing member 15. The washer 17 is clamped between the brake member 12 and the pushing member 13, and the washer 17 is circumferentially fixed with respect to the fixing member 15.

In other words, when the brake member 12 is circumferentially rotated with respect to the fixing member 15, relative rotation also takes place between the washer 17 and the brake member 12. The washer 17 is stationary in the circumferential direction with respect to the fixing member 15, such that the pushing member 13 is stationary with respect to the fixing member 15, which ensures a stability of the pushing member 13.

Specifically, as shown in FIG. 2, in one embodiment, when the washer 17 is annular in shape, the manner in which the washer 17 and the fixing member 15 are circumferentially fixed can be as that, a concavo-convex fitting structure is provided between an inner ring of the washer 17 and the fixing member 15, so as to prevent the washer 17 from rotating in the circumferential direction with respect to the fixing member 15.

Further specifically, as shown in FIG. 2, an outer circumferential surface of the fixing member 15 is provided with a limiting groove 153 that extends along an axial direction of the fixing member 15, and the inner ring of the washer 17 is provided with a limiting protrusion 171 corresponding to the positioning groove 153.

When the washer 17 is sleeved on the fixing member 15, the limiting protrusion 171 of the inner ring of the washer 17 is located in the limiting groove 153, thereby restraining the circumferential movement of the washer 17 with respect to the fixing member 15.

Further specifically, in one embodiment, the washer 17 is a polyoxymethylene (POM) washer. The washer 17 can also be made of other engineering plastics having an appropriate coefficient of friction, and is not particularly limited hereto.

Further, in one embodiment, as shown in FIGS. 1, 2, 5, and 6, the brake mechanism 10 may further include a pushing nut 16 that is sleeved on the fixing member 15. The pushing nut 16 abuts against a side of the pushing member 13 away from the brake member 12. The fixing member 15 is provided with a screw thread 151 at a position corresponding to the pushing nut 16, and the screw thread 151 corresponds to the pushing nut 16.

When the pushing member 13 is an elastic member, by adjusting the depth at which the pushing nut 16 is screwed into the fixing member 15, i.e., by adjusting the distance between the pushing nut 16 and the brake member 12, the amount of pre-compression of the elastic member can be adjusted, such that the friction force between the brake member 12 and the friction member 11 can be always maintained within the appropriate range.

Further, in one embodiment, as shown in FIG. 2, one end of the fixing member 15 adjacent to the friction member 11 may be provided with a fixing plate 152 that is connected to the fixing member 15. An outer diameter of the fixing plate 152 is greater than an outer diameter of the fixing member 15, and the friction member 11 is fixedly connected to the fixing plate 152, thereby indirectly achieving a fixed connection between the friction member 11 and the fixing member 15 in the circumferential direction.

Specifically, the friction member 11 can be adhered to the fixing plate 152. For example, as shown in FIG. 2, the fixing plate 152 may be provided with an auxiliary groove 1521 on a side surface thereof opposite to the friction member 11. The auxiliary groove 1521 is used to place adhesive. Thus, a fixed connection between the fixing plate 152 and the friction member 11 can be achieved by the adhesive.

Further, in one embodiment, the friction member 11 can be a polycarbonate (PC) friction sheet or other engineering plastic having an appropriate coefficient of friction, and is not particularly limited hereto.

The brake member 12 can be made of a metal material, such as a metal brake member, or other material having a certain strength.

Figure 3:
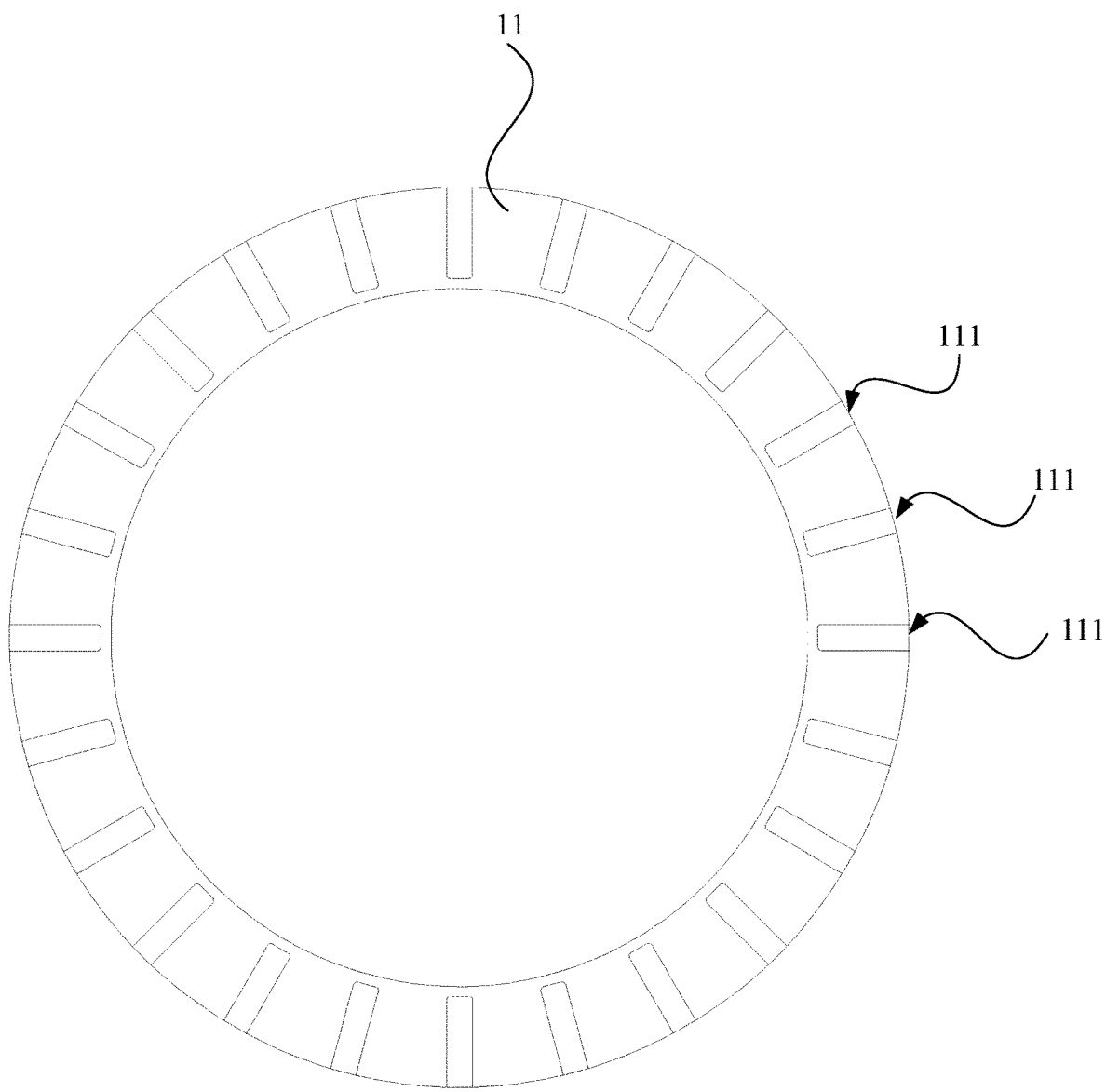
FIG. 3 is a right view of a friction member of the brake mechanism of FIG.

Further, in one embodiment, as shown in FIG. 3, the friction member 11 may be provided with a number of grooves 111 on a side surface thereof opposite to the brake member 12. The grooves 111 extend radially on the friction member, and the grooves 111 are spaced apart in the circumferential direction of the friction member 11.

When the friction between the friction member 11 and the brake member 12 generates powder, the generated powder can be temporarily stored in the groove 111, thus preventing the powder from affecting the friction force between the friction member 11 and the brake member 12.

Further, as shown in FIG. 3, the groove 111 extends to the outer circumferential surface of the friction member 11, such that the powder temporarily stored in the groove 111 can be discharged from the groove 111.

Figure 4:
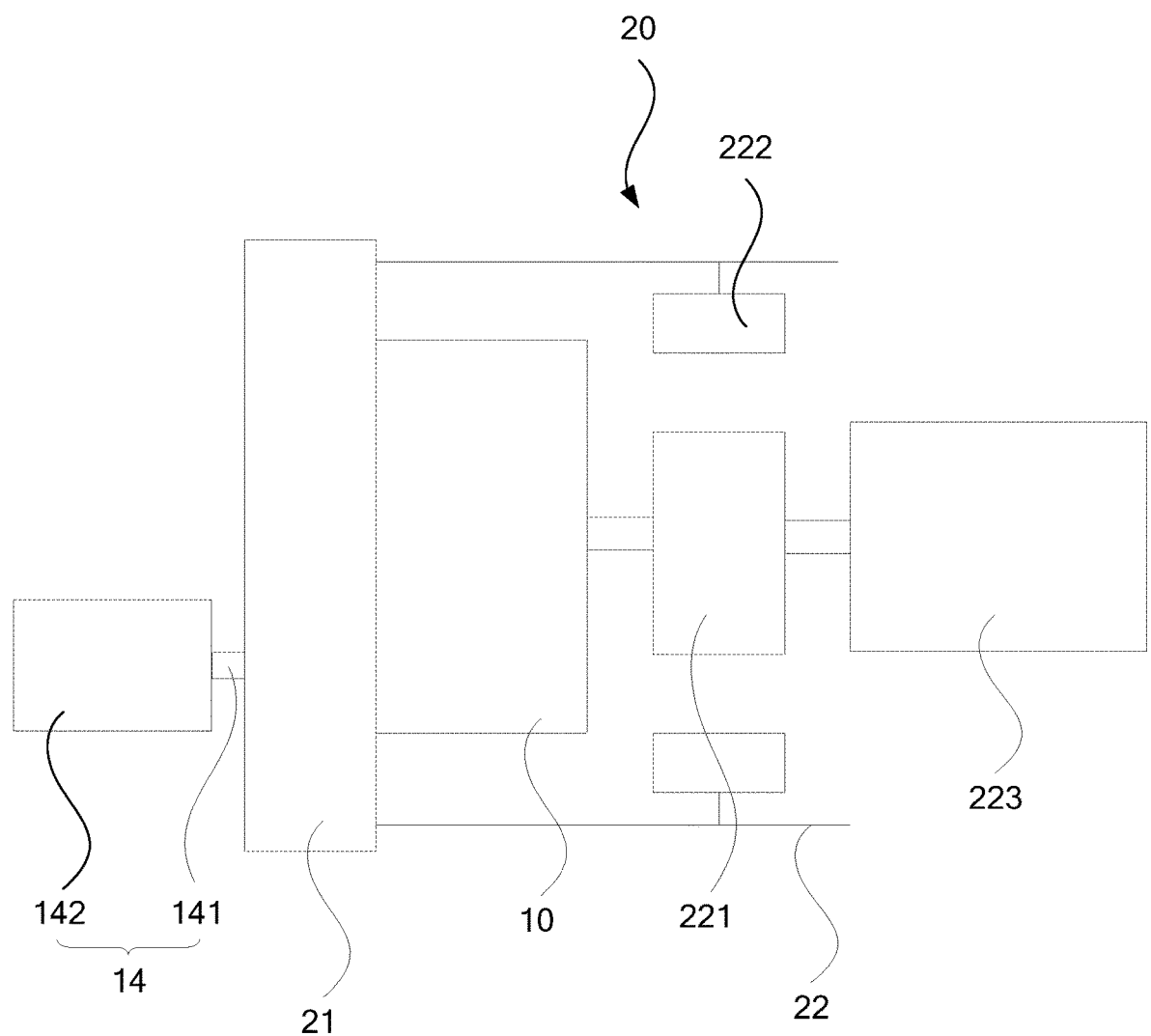
FIG. 4 is a schematic view of a joint actuator in accordance with another embodiment of the present disclosure.

Further, in another embodiment, as shown in FIG. 4, a joint actuator 20 is provided, which includes a motor 22 and the aforementioned brake mechanism 10. The friction member 11 is fixed to a rotor 221 of the motor 22.

Specifically, when the fixing member 15 is included in the brake mechanism 10, the rotor 221 of the motor 22 is connected to the fixing member 15. During normal operation, the rotor 221 of the motor 22 rotates with respect to the stator 222, thus driving the output end 223 to move simultaneously. When the output end 223 moves to the target position and needs to be stopped, the brake mechanism 10 prevents the rotor 221 of the motor 22 from rotating under the friction force, thereby stopping the output end 223 from moving.

By providing the brake mechanism 10 described in any of the above embodiments in the joint actuator 20, the friction force between the friction member 11 and the brake member 12 can be always maintained within the appropriate range during use. The impact on other components of the joint actuator 20 during brake may be reduced, and the purpose of brake can also be achieved.

Figure 5:
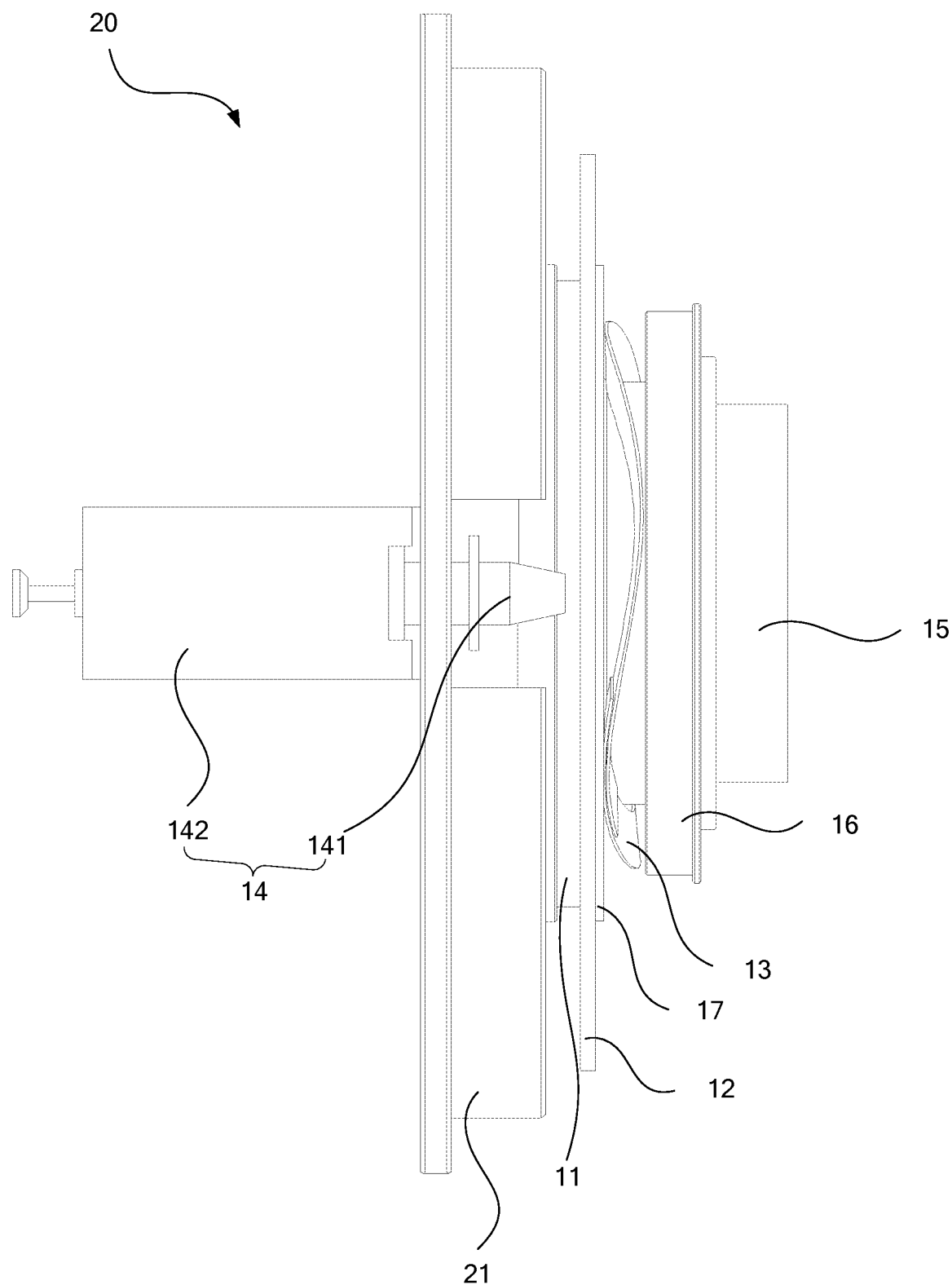
FIG. 5 is a front view of the joint actuator of FIG. 4 where the motor is removed.
Figure 6:
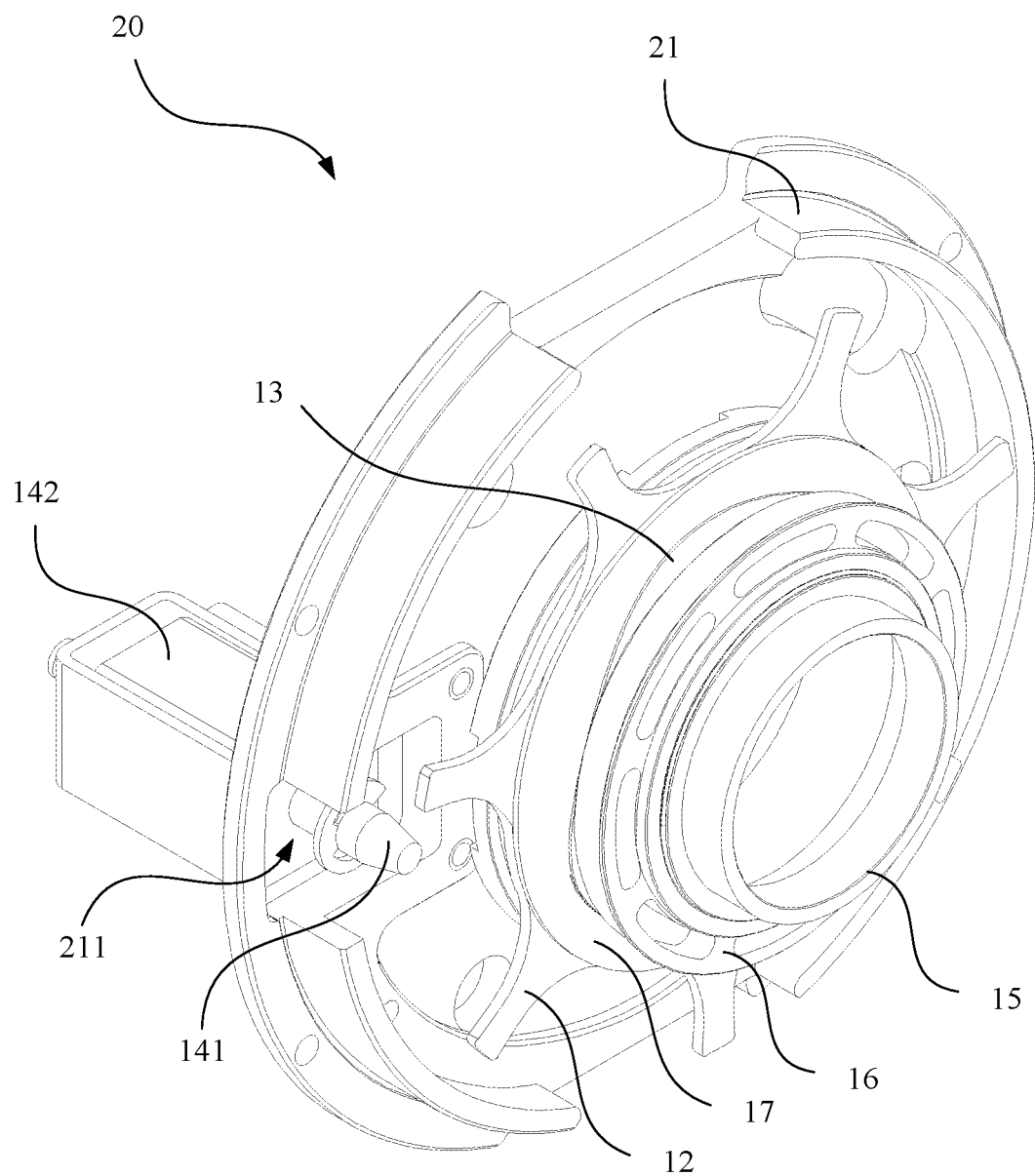
FIG. 6 is a perspective view of the joint actuator of FIG. 5.

Further, in one embodiment, as shown in FIGS. 4 to 6, the locking mechanism 14 may include a stopping needle 141 and a driving member 142 connected to each other. An outer ring of the brake member 12 is provided with brake teeth, and the stopping needle 141 is disposed at a position corresponding to the brake teeth. The driving member 142 is used to drive the stopping needle 141 to stretch out and retract.

When it is required to brake, the driving member 142 drives the stopping needle 141 to stretch out, and the stopping needle 141 contacts the brake teeth to prevent the brake member 12 from rotating, thus achieving braking. When it is not required to brake, the driving member 142 drives the stopping needle 141 to retract, such that the stopping needle 141 is offset from the brake member 12, thereby enabling the fixing member 15 which rotates together with the rotor 221 of the motor 22, and the each component sleeved on the fixing member 15 to rotate.

Further, as shown in FIGS. 5 and 6, in one embodiment, one end of the stopping needle 141 adjacent to the brake member 12 is conical in shape, therefore it is effectively prevented that the stopping needle 141 is stuck with the brake member 12 when the stopping needle 141 is stretched out.

Figure 7:
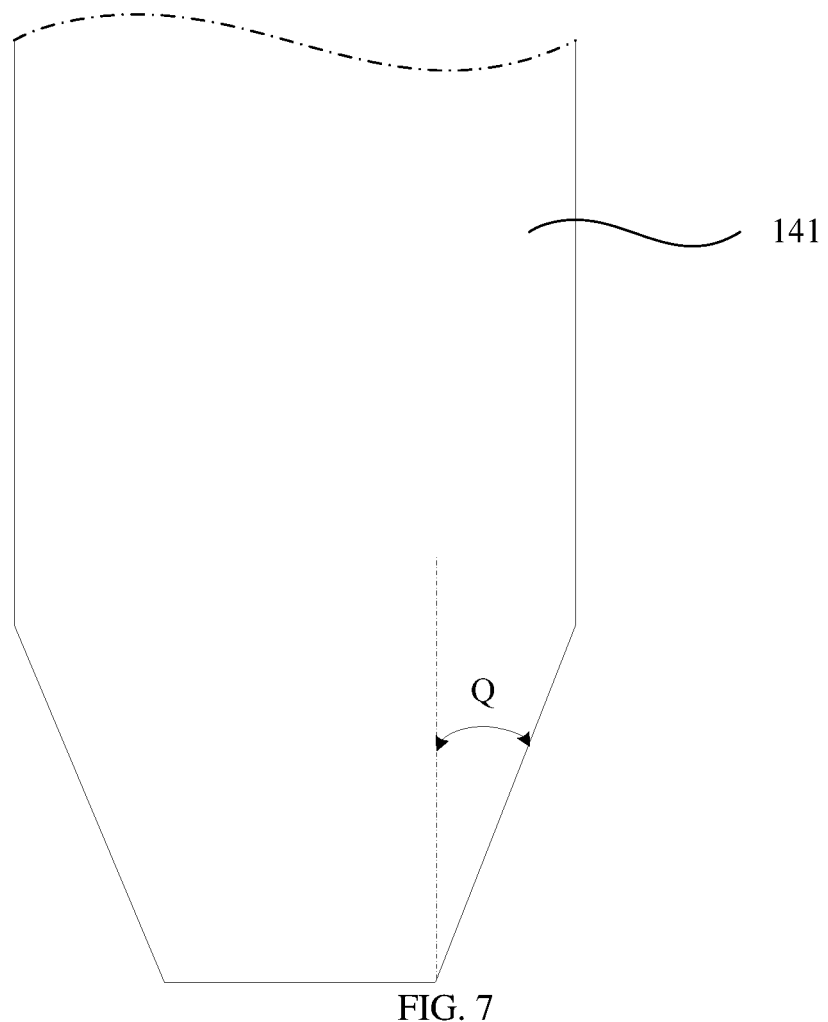
FIG. 7 is a schematic view of a stopping needle of a joint actuator in accordance with another embodiment of the present disclosure.

Specifically, as shown in FIG. 7, when an inclination angle of the conical surface of the stopping needle 141 is Q, and a friction coefficient $\mu=\tan Q$, then $Q=\arctan \mu$, the brake member is not easily stuck when being in contact with the stopping needle 141.

Further, as shown in FIGS. 4 to 6, the joint actuator 20 may further include a motor cover 21. The driving member 142 is an electromagnetic driving member located on an outer side of the motor cover 21. The brake mechanism 10 is located on an inner side of the motor cover 21. The motor cover 21 is provided with a through hole 211, the stopping needle 141 extends through the through hole 211 and corresponds to the brake member 12.

The fixing member 15, the friction member 11, and other components driven by the rotor 221 of the motor 22 rotate with the rotor 221 of the motor 22 on the inner side of the motor cover 21, while the electromagnetic driving member and the stopping needle 141 are stationary with respect to the motor cover 21. When it is required to brake, the electromagnetic driving member 142 drives the stopping needle 141 to stretch out, thus stopping the brake member 12 on the inner side of the motor cover 21, thereby achieving braking.

Figure 8:
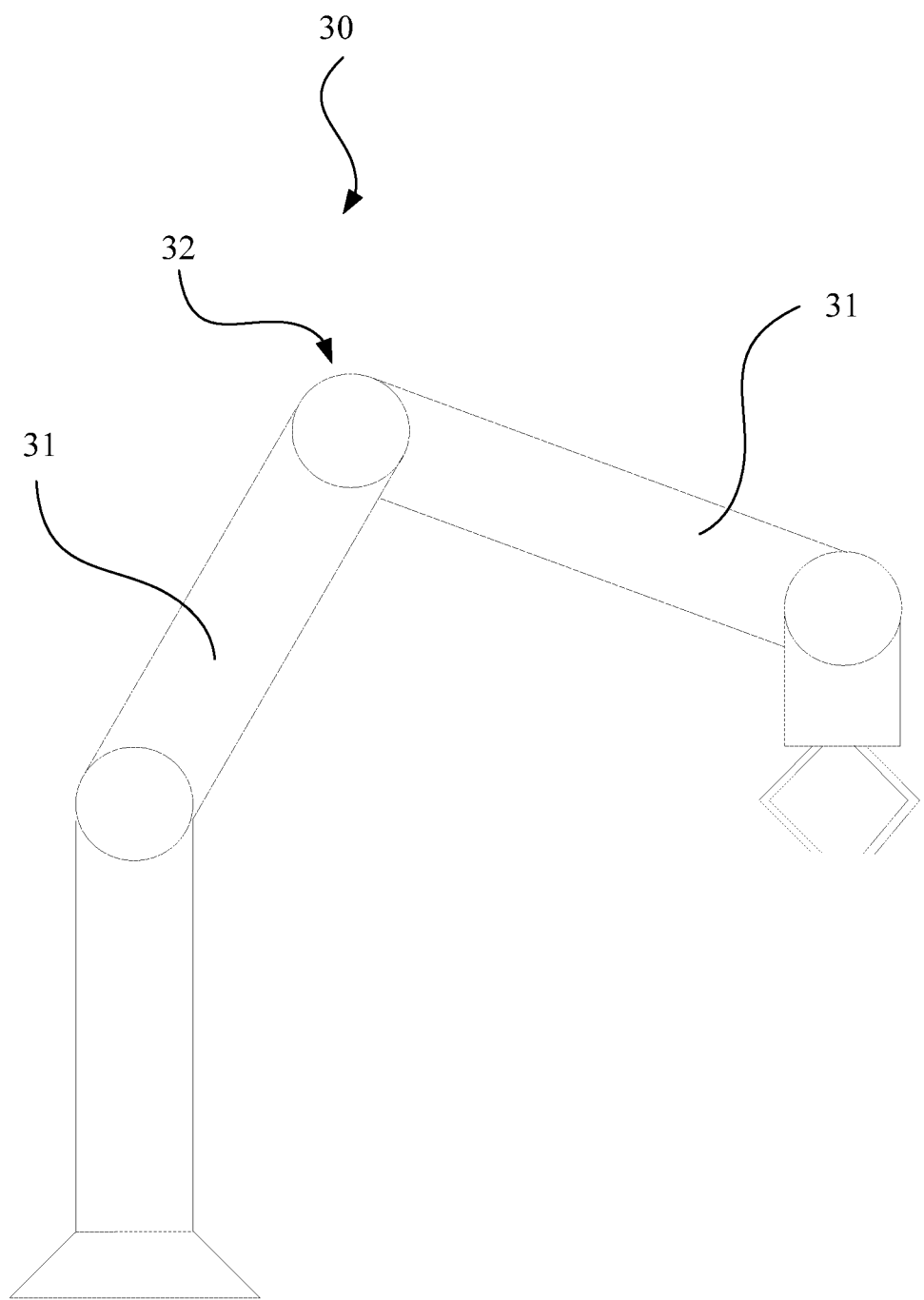
FIG. 8 is a front view of a robot of the embodiment.

Further, in another embodiment, as shown in FIG. 8, a robot 30 is provided. The robot 30 may include the joint actuator 20 described in any of the above embodiments.

Specifically, the joint actuator 20 can be located in a robot arm 31 of the robot 30 to control the brake process of the robot arm 31.

By providing the joint actuator 20 described in any of the above embodiments in the robot 30, the friction force between the friction member 11 and the brake member 12 can be maintained within the appropriate range. Impact during braking may be reduced and large braking stroke due to poor friction which may affect the safety of breaking of the robot 30 may be avoided.

In addition, when the robot 30 is in a stationary state, the joint actuator 20 is in a brake state. When an external impact or an external force is applied to the robot arm 31 of the robot 30, if the external force exceeds a predetermined value, relative rotation will occur between the friction member 11 and the brake member 12, thereby avoiding the damage to transmission components in the joint 32 of the robot 30 by the external impact or the excessive force.

Specifically, in one embodiment, as shown in FIG. 8, the robot 30 further includes a number of robot arms 31 and a number of joints 32. The robot arms 31 are sequentially connected. Adjacent robot arms 31 are connected via the joints 32. Each of the joints 32 is provided with the joint actuator 20.

For example, the robot 30 can be a six axis robot or a seven axis robot. The robot 30 can correspondingly include six joints 32 or seven joints 32, and the robot arms 31 connected to the joints 32.

During normal operations of the robot 30, the rotor 221 of the motor 22 rotates with respect to the stator 222, the output end 223 transmits the rotation to one of the adjacent robot arms 31, and drives the robot arm 31 to rotate with respect to another adjacent robot arm 31, thereby performing the corresponding action. When the robot arms 31 are moved to the target position, it is required to prevent the motor 22 from continuing to rotate by a brake process and make the robot arm 31 to stop at the target position. By employing the above-described joint actuator 20, the wear between the friction member 11 and the brake member 12 can be reduced while the precision and accuracy of the movement of the robot 30 can be ensured.

The technical features of the above-described embodiments can be arbitrarily combined. For the sake of brevity of description, all possible combinations of the respective technical features in the above-described embodiments have not been described, however, as long as there is no contradiction in the combination of these technical features, it should be deemed to be the scope of the specification.

The above-described embodiments represent only several embodiments of the present disclosure, the description of which is more specific and detailed, but is not to be construed as limiting the scope of the disclosure. It should be noted that, for those of ordinary skill in the art, several modifications and improvements can be made without departing from the concept of the present disclosure, which fall within the scope of the present disclosure. Therefore, the scope of protection of the disclosure patent shall be subject to the appended claims.

What is claimed is:

1. A brake mechanism for a motor, the brake mechanism comprising:

a friction member configured to be fixed to a rotor of the motor;

a brake member, the friction member abutting against one side of the brake member;

a pushing member abutting against the other side of the brake member and configured to provide an adjustable pushing force to the brake member;

a locking mechanism configured to prevent the brake member from rotating according to a brake command; and a fixing member;

wherein the friction member and the brake member are annular in shape;

wherein the friction member and the brake member are sleeved on the fixing member;

wherein the friction member is circumferentially fixed with respect to the fixing member; and wherein the brake member is circumferentially slidable with respect to the fixing member;

wherein the friction member is provided with a plurality of grooves on a side surface thereof opposite to the brake member, the plurality of grooves extend radially on the friction member, and the plurality of the grooves are spaced apart in a circumferential direction of the friction member.

2. The brake mechanism of claim 1, further comprising a pushing nut sleeved on the fixing member;

wherein the pushing nut abuts against a side of the pushing member away from the brake member;

wherein the fixing member is provided with a screw thread at a position corresponding to the pushing nut, and the screw thread corresponding to the pushing nut.

3. The brake mechanism of claim 1, wherein one end of the fixing member adjacent to the friction member is provided with a fixing plate connected to the fixing member;

an outer diameter of the fixing plate is greater than an outer diameter of the fixing member; and the friction member is fixedly connected to the fixing plate.

4. The brake mechanism of claim 3, wherein the fixing plate is provided with an auxiliary groove on a side surface thereof opposite to the friction member;

the auxiliary groove is configured to place an adhesive; and the friction member is adhered to the fixing plate.

5. The brake mechanism of claim 1, further comprising a washer sleeved on the fixing member; wherein the washer is clamped between the brake member and the pushing member, and the washer is circumferentially fixed with respect to the fixing member.

6. The brake mechanism of claim 5, wherein the washer is annular in shape;

a concavo-convex fitting structure is provided between an inner ring of the washer and the fixing member, the concavo-convex fitting structure is configured to prevent the washer from rotating in the circumferential direction with respect to the fixing member.

7. The brake mechanism of claim 6, wherein an outer circumferential surface of the fixing member is provided with a limiting groove extending along an axial direction thereof; the inner ring of the washer is provided with a limiting protrusion corresponding to the limiting groove.

8. The brake mechanism of claim 1, further comprising a washer clamped between the brake member and the pushing member.

9. The brake mechanism according to claim 5, wherein the washer is a polyoxymethylene (POM) washer.

10. The brake mechanism of claim 1, wherein the pushing member is an annular pushing spring, one side of the pushing spring abuts against the brake member to provide a pushing force to the brake member.

11. The brake mechanism of claim 1, wherein the pushing member comprises a plurality of columnar compression springs, the plurality of compression springs are spaced apart in the circumferential direction of the brake member, one end of the compression spring abuts against the brake member to provide a pushing force to the brake member.

12. The brake mechanism of claim 1, wherein the pushing member comprises a first electromagnet and a second electromagnet, the first electromagnet abuts against the brake member, the second electromagnet is arranged corresponding to the first electromagnet;

mutually exclusive force is generated between the first electromagnet and the second electromagnet when the first electromagnet and the second electromagnet are energized; and magnetic force of the first electromagnet and/or the second electromagnet is adjustable.

13. A joint actuator comprising a motor and a brake mechanism of claim 1, the friction member being fixedly connected to a rotor of the motor.

14. The joint actuator of claim 13, wherein the locking mechanism comprises a stopping needle and a driving member connected to each other, an outer ring of the brake member is provided with brake teeth, the driving member is configured to drive the stopping needle to stretch out and retract, the stopping needle is capable of stretching out to be in contact with the brake teeth in response to the brake command to prevent the brake member from rotating.

15. The joint actuator of claim 14, wherein one end of the stopping needle adjacent to the brake member is conical in shape.

16. The joint actuator of claim 14, further comprising a motor cover;

wherein the driving member is an electromagnetic driving member located on an outer side of the motor cover;

the brake mechanism is located on an inner side of the motor cover;

the motor cover is provided with a through hole, the stopping needle extends through the through hole and corresponds to the brake member.

17. A robot comprising the joint actuator of claim 13.

18. The robot of claim 17, further comprising a plurality of robot arms and a plurality of joints;

wherein the plurality of robot arms are sequentially connected, adjacent robot arms are connected via the joints, each of the joints is provided with the joint actuator.

* * * * *